United States Patent [19]
Harlow

[11] Patent Number: 4,801,501
[45] Date of Patent: Jan. 31, 1989

[54] INSULATED CONDUCTOR WITH MULTI-LAYER, HIGH TEMPERATURE INSULATION

[75] Inventor: Norman R. Harlow, Cornwall-on-Hudson, N.Y.

[73] Assignee: Carlisle Corporation, Buchanan, N.Y.

[21] Appl. No.: 99,248

[22] Filed: Sep. 21, 1987

Related U.S. Application Data

[60] Continuation-in-part of Ser. No. 901,740, Aug. 28, 1986, abandoned, which is a division of Ser. No. 68,615, Jun. 30, 1987.

[51] Int. Cl.[4] ........................ B32B 15/00; B32B 27/00; H01B 7/00

[52] U.S. Cl. .................................... 428/383; 428/375; 428/379; 174/120 SR

[58] Field of Search ............... 428/375, 379, 383, 421, 428/422, 473.5, 474.4, 475.5; 174/120 SR, 110 F; 526/255

[56] References Cited

U.S. PATENT DOCUMENTS

| | | | |
|---|---|---|---|
| 3,132,123 | 5/1964 | Harris et al. | 526/247 |
| 3,352,714 | 11/1967 | Anderson et al. | 428/383 |
| 3,408,453 | 10/1968 | Shelton | 174/120 SR |
| 3,422,215 | 1/1969 | Humes | 174/120 |
| 4,184,001 | 1/1980 | Hildreth | 428/383 X |
| 4,273,829 | 6/1981 | Perreault | 428/383 |
| 4,321,177 | 3/1982 | Wilkinson | 428/422 |
| 4,576,857 | 3/1986 | Cannett et al. | 428/260 |
| 4,628,003 | 12/1986 | Katz | 428/391 X |

*Primary Examiner*—Lorraine T. Kendell
*Attorney, Agent, or Firm*—Brooks Haidt Haffner & Delahunty

[57] ABSTRACT

An insulated conductor for high temperature use and methods of manufacture thereof. The conductor is insulated by at least three layers of insulation, the inner layer being made of a perfluoroalkoxy, a polytetrafluoroethylene, an ethylene-tetrafluoroethylene, or a fluorinated ethylene-propylene resin compound, the second layer being made of a polyimide resin compound and the third layer being made of perfluoroalkoxy, an ethylene-tetrafluoroethylene copolymer, a non-hydrolizing, thermoset polyamide or a polyvinylidene fluoride resin compound. The layers are coated or extruded over the conductor and each other and preferably, the first layer is etched before the second layer is applied.

19 Claims, 2 Drawing Sheets

INSULATED CONDUCTOR WITH MULTI-LAYER, HIGH TEMPERATURE INSULATION

This application is a continuation-in-part of my co-pending application Ser. No. 901,740, filed Aug. 28, 1986 and entitled "Insulated Conductor with Multi-Layer, High Temperature Insulation" and now abandoned, and its divisional application Ser. No. 068,615 filed June 30, 1987 also copending.

This invention relates to an insulated conductor with a plurality of layers of insulation able to withstand relatively high temperatures and mechanical abuse and to the manufacture thereof.

Insulated conductors which have insulation which is satisfactory for use at relatively high temperatures, i.e. 200° C. and higher, are desirable for many applications and particularly for installation in aircraft and missiles. One such insulated conductor is described in Military Specification Sheet MIL-W-81381/7E and comprises a plurality of stranded wires plated with silver or nickel and surrounded by two helical layers of fluorocarbon/-polyimide tape, the outer layer of tape being coated with an aromatic polyimide resin. The tape may be a film of the type sold by E .I. DuPont de Nemours & Co., Wilmington, Del., under the trademark KAPTON, such tape being a thermoset polyimide film combined with a fluorinated ethylene-propylene copolymer film for sealing purposes. The polyimide resin coating is used to provide color identification and to smooth and help protect the tapes with respect to the environment.

While the described insulation conductor will meet a 200° C. temperature rating requirement, it has several disadvantages. The main disadvantage is the problem of proper adhesion of the coating to the tape because of its tendency to hydrolize. Other disadvantages are the necessity of winding two layers of opposite hand with proper overlap and the problem of maintaining dimensions at tape splices.

Another insulated conductor has two extruded layers of irradiated, and hence, cross-linked, ethylenetetrafluoroethylene copolymer (ETFE). However, such insulation has had limited success in meeting flammability requirements and is marginal in meeting even a 150° C. temperature rating.

While polyimide, both thermoplastic and thermoset, has good high temperature properties, it is difficult to apply it directly to the conductors because of air in the interstices of the conductors and the polyimide has strong adhesion to the conductors making it difficult to strip the insulation. Polyimide layers are also subject to cracking and hydrolizing unless the cross-linking thereof is substantially perfect, perfection being difficult to obtain under usual manufacturing conditions.

One object of the invention is to provide an insulated conductor which can be temperature rated at at least 200° C.

Another object of the invention is to overcome problems with insulated conductors described hereinbefore.

In accordance with the preferred embodiments of the invention, a first layer of perfluoroalkoxy (PFA) resin compound, a polytetrafluoroethylene (PTFE) resin compound, an ethylene-tetrafluoroethylene (ETFE) resin compound or a fluorinated ethylene-propylene (FEP) resin compound is extruded over and in contact with the conductor or conductors which provides a layer of insulation which can withstand a temperature of at least 250° C. and which makes the multi-layer insulation readily strippable from the conductor or conductors. The outer surface of the first layer is etched in a conventional manner, and therafter, a layer of polyimide in a solvent having a relatively high polyimide content preferably is extruded over the first layer and the solvent is removed by heat to provide a solid second layer of polyimide. Then, a third layer, a layer of PFA compound, an ETFE compound, a polyvinylidenefluoride (PVDF) compound or a non-hydrolizing polyamide compound which thermosets is extruded over the second layer, such third layer protecting the polyimide, second layer from the environment.

Although in the preferred embodiment each of the three layers of insulation is extruded over the conductor, or the conductor with one or more layers of insulation thereon, in an alternative embodiment, one or more, or all, the layers may be applied by conventional coating techniques.

Other objects and advantages of the present invention will be apparent from the following detailed description of the presently preferred embodiments thereof, which description should be considered in conjunction with the accompanying drawings in which.

Figure 1:
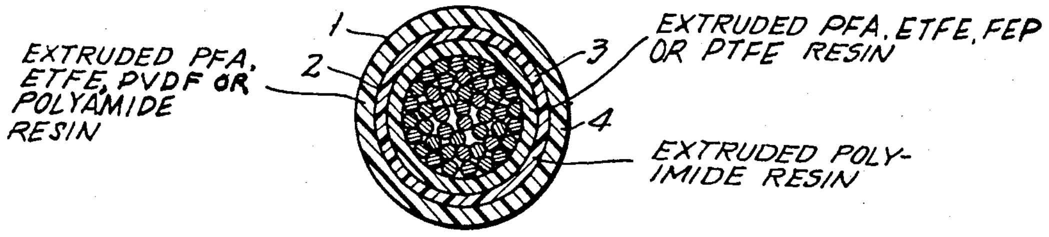
FIG. 1 is a transverse cross-section of the insulated conductor of the invention.

FIG. 1 illustrates an insulated conductor of the invention which comprises a central conductor 1 formed, in this case, by a plurality of copper wires. However, the conductor could be a single wire. The wire or wires are plated with a metal such a tin, silver or nickel. Tin may be used if the insulation conductor is to be rated at 150° C., silver, if the insulated conductor is to be rated at 200° C. or nickel, if the insulated conductor is to be rated at above 200° C., e.g. 250° C. Of course, nickel may be used for all such ratings, and silver may be used for all ratings up to 200° C. The temperature rating of the insulated conductor of the invention is determined from the tests described in the Military Specification MIL-W-81381A and the tests referred to therein. The insulated conductor of the invention may be rated at above 200° C., e.g. 250° C., if the wire or wires are coated with nickel. Of course, in some cases, particularly, if it is not necessary to meet a military specification, the plating metal may be omitted.

The conductor 1 is covered by a first layer 2 extruded or coated thereover and in contact therewith. To provide ease of strippability, the layer 2 is a layer of PFA, PTFE, ETFE or FEP which is extruded or coated over the conductor 1 by conventional wire covering equipment and techniques or is covered by a layer of PTFE which is coated over the conductor 1 or extruded over the conductor 1 in paste form by conventional wire covering equipment and techniques. If the layer 2 is an extruded layer of PFA, ETFE or FEP, the layer 2 is merely cooled after application to the conductor 1, and if the layer 2 is an extruded layer of PTFE, it is heated to cause it to become sintered and thermoset.

After the first layer 2 is set, it is covered by a second layer 3 which is extruded or coated over the layer 2 and is in contact therewith. Preferably, the outer surface of the layer 2 is etched by conventional methods, such as by acid or plasma, before the layer 3 is extruded or coated thereover so as to improve the adhesion between layers 2 and 3.

When second layer 3 is formed by coating of the first layer 2, the coating is applied in a conventional manner, using a lacquer comprising thermosettable polyimide in a known solvent. The lacquer may include other known materials to prevent settling of the polyimide and for other purposes. If the polyimide is a thermoplastic, it can be extruded over the first layer 2 in a conventional manner.

However, in the preferred embodiment, a lacquer which contains at least 20 % by weight of polyimide solids, so that the lacquer has a relatively high viscosity, is extruded over the layer 2. In this way, a relatively thick layer of the polyimide, e.g. 1–2 mils in thickness, can be applied to the layer 2 without requiring several passes of the conductor 1 with the layer 2 thereon through a bath or polyimide lacquer.

Figure 2:
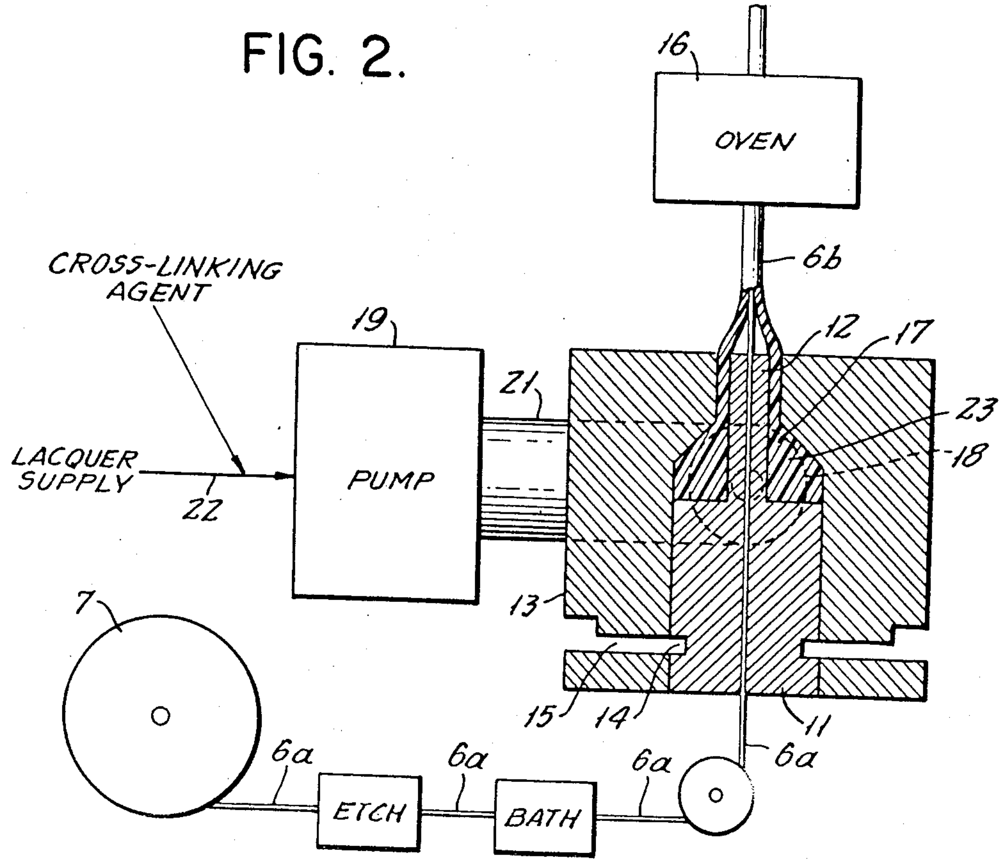
FIG. 2 is a partly schematic and partly cross-sectional diagram illustrating the manner in which a polyimide containing lacquer may be extruded over the first layer of the conductor.
Figure 3:
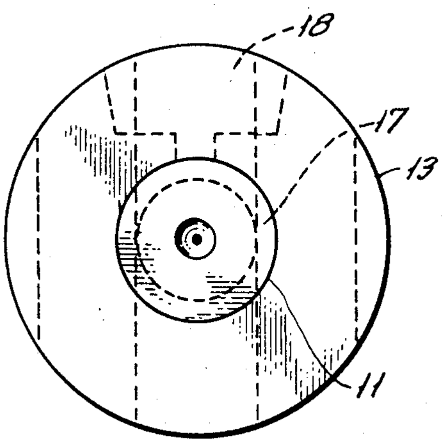
FIG. 3 is an end view of the die shown in FIG. 2.

FIGS. 2 and 3 illustrate the novel process and apparatus of the invention for extruding a polyimide containing lacquer over an elongated article, such as the conductor 1 is covered with the layer 2. However, the process and apparatus of the invention can also be used for covering other articles, such as tubes, rods, wires, etc.

As illustrated in FIG. 2, the conductor with the layer 2 thereon, designated as 6*a*, is fed from a reel 7 through an etching bath 8 where the exterior surface of the layer 2 is etched. The insulated conductor 6*a* is then passed through a bath 9 to remove the etchant and is thereafter dried. The conductor 6*a* is then passed around a pulley 10 to change its direction to a vertical path so that when the lacquer is applied thereto, it does not sag to one side of the conductor axis and make the layer 3 non-concentric with the axis of the conductor.

From the pulley 10, the conductor 6*a* passes through the bore of a die insert 11 having an extension 12 and received in a die body 13. The insert 11 has a groove 14 and the body 13 has a groove 15 for receiving a retaining clip (not shown) which retains the insert 11 in the body 13.

As the insulated conductor 6*a* leaves the extension 12, a layer of the viscous polyimide lacquer is extruded thereover to provide an insulated conductor, designated as 6*b*, insulated by the layers 2 and 3, and the insulated conductor 6*b* is passed through an oven 16, which represents a series of ovens, where the lacquer solvent is driven off and the layer 3 becomes thermoset. The temperature in the ovens 16 is selected based on the boiling point of the solvent and the temperature required for the crosslinking of the polyimide, and the temperature normally increases from the entrance to the oven 16 to the exit from the oven 16. For example, the temperature at the entrance may be 250° C.–300° C. and the temperature at the exit may be 600° C. The time of transit of the insulated conductor 6*b* through the oven 16 is selected so as to both remove the solvent and cross-link, or thermoset, the polyimide.

The die, comprising the body 13 and the insert 11, has a cavity 17 around the extension 12 which receives, through the opening 18 in the body 13 (see FIGS. 2 and 3) the lacquer 23 which forms the layer 3. The lacquer 23 is extruded in tubular form around the insulated conductor 6*a* by reason of the extension 12, and contracts around the layer 2. By reason of the extension 12, the layer 3 is of uniform thickness around, and concentric with, the axis of the conductor.

The polyimide containing lacquer is supplied under pressure from the metering pump 19 by way of the line 21 and is supplied to the pump 19 from any conventional source by way of the line 22. For cross-linking accelerating purposes, the lacquer which is supplied to the opening 18 may contain a conventional crosslinking agent, such as an acetic anhydride and beta-picoline. Preferably, the cross-linking agent is supplied to the pump 19 as indicated in FIG. 2 by another metering pump (not shown). The pressure at which the lacquer is supplied to the opening 18 depends, as is known to those skilled in the art, upon several factors including the viscosity of the lacquer and the speed at which the insulated conductor passes through the die. With a lacquer of the type described hereinafter, the pressure may be on the order of 150–200 psi.

Polyimide lacquers containing at least 15 % by weight of the lacquer of thermosettable polyimide solids are commercially available but are usually used for coating purposes. Such lacquers also usually contain suspensoids, anti-oxidants and other materials in minor amounts. The solvent used depends on various factors, but the polyimide solids content and the solvent employed for the lacquer are selected so that the lacquer has a relatively high viscosity. Preferably, the polyimide solids content is at least 25 % and the lacquer has a viscosity of at least 200,000 centipoises. One suitable solvent is normal methyl pyrrolidone. A lacquer which has been found to be satisfactory has 25 % by weight of the lacquer of thermosettable polyimide solids in such solvent and has a viscosity of about 240,000 centipoises. With such lacquer and the method and apparatus of the invention, a thermoset layer 3 of 1–2 mils in thickness can be obtained with a single pass through the die shown in FIG. 2.

Figure 4:
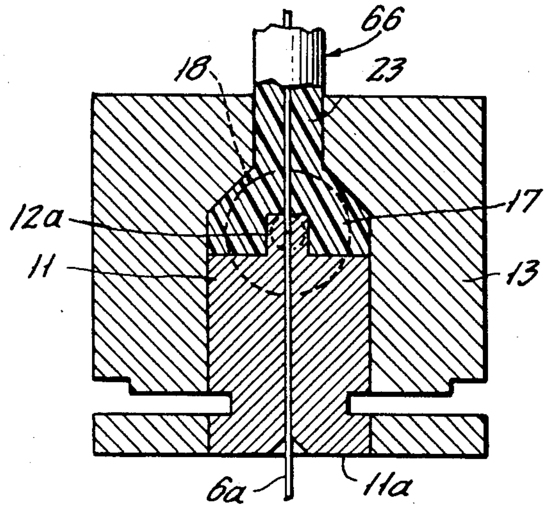
FIG. 4 is a fragmentary, cross-sectional view of a modified form of the die shown in FIG. 2.

FIG. 4 illustrates a modified form of the die insert 11 shown in FIGS. 2 and 3. Although the die of FIGS. 2 and 3 is preferred because it gives better control of the thickness and concentricity of the layer 3, a die with the insert 11*a* shown in FIG. 4 may be found to be satisfactory.

In the embodiment shown in FIG. 4, the die body 13 is the same as the die body shown in FIGS. 2 and 3, and the insert 11*a* is substantially the same as the insert 11, except for the extension 12*a* which is shorter than the extension 12 or which may be omitted entirely. With the insert 11*a*, the lacquer 23 impinges directly on the insulated conductor 6*a* within the cavity 17. With irregularities in the flow of the lacquer 23, the insulated conductor 6*a* may be displaced radially by the lacquer 23 causing the layer 3 to be not concentric with the axis of the conductor at various points in the direction of the axis of the conductor which, however, can be acceptable for some end uses for the insulated conductor.

Although it is preferred to cause the polyimide to become thermoset with heating and a cross-linking agent since the layer 3 is heated in the oven 16 to remove the solvent and heating in the oven 16 can cause both removal of the solvent and thermosetting of the polyimide, it will be apparent that the thermosetting of the polyimide can be accomplished by other conventional methods. Thus, the cross-linking agent can be omitted, and the thermosetting of the polyimide can be caused by heat alone or by irradiation of the layer 3.

After the layer 3 of polyimide lacquer is extruded or coated over the layer 2, the layer 3 is heated in a known manner to remove the solvent and to cause the material of the layer 3 to become thermoset.

After the layer 3 is set, a third layer 4 is extruded or coated over the layer 3. The third layer 4 can be a plastic material which will withstand the temperature to which the insulated conductor is subjected and which will protect the layer 3 from the environment. It is preferred that the third layer 4 comprise PFA, ETFE, or a substantially non-hydrolizing polyamide which thermosets, but for a temperature rating of 200° C. and higher, it is preferred that the third layer 4 comprise PFA which is extruded or coated over the layer 3 in a conventional manner. When ETFE, or a polyamide is used, it is extruded or coated over the layer 3 in a conventional manner, and if desired, when layer 4 comprises PVDF or a polyamide, the layer 4 may be cross-linked by radiation or with a cross-linking agent and heat.

If a polyamide is used for the layer 4, it is essential that it be a substantially non-hydrolizing polyamide which is thermosettable. Polyamides with such properties are known in the art and are commercially available, one such polyamide being known as Imitec extrudable polyamide available from Imitec, Inc., Schnectady, N. Y.

The radial thicknesses of the layer 2, 3 and 4 may be selected so as to provide the desired radial thickness of insulation. For example, if the desired total thickness is 7 mils, the layers 2 and 4 may have thicknesses of 3 mils and the layer 3 may have a thickness of 1 mil. It is not necessary that the layers 2 and 4 have the same thickness, but normally the thicknesses of the layers 2 and 4 will be greater than the thickness of the layer 3, e.g., up to three times or more of the thickness of the layer 3.

An insulated conductor made as described hereinbefore will have a temperature rating of at least 150° C., and if made with a layer 4 of PFA, will have a temperature rating in excess of 200° C.

It will be observed that in the preferred embodiment, each layer of insulation is applied by extrusion which permits close control of the dimensions and concentricity of the insulation and eliminates multiple passes of the conductor through a liquid in obtaining any of the layers. Furthermore, no wrapping or splicing of tapes is required. In addition, the application of the polyimide resin directly to the conductor, and its attendant problems, is eliminated, and the problems of cracking, separation and hydrolizing of the polyimide layer are avoided or overcome.

The various layers of insulating material may be applied while the conductor is advanced lengthwise using conventional extrusion equipment which is used to extrude insulation over a conductor. Thus, while the conductor is advanced lengthwise, the first layer is extruded thereover. When the first layer is set and while the conductor with the first layer thereon in advanced lengthwise, the second layer is extruded thereover. When the second layer is set, the conductor with the first and second layers thereon are advanced lengthwise, and the third layer is extruded thereover. Each layer may be applied individually, i.e. with storage of the conductor on a reel after each layer is applied and subsequent feeding of the covered conductor from the reel to the apparatus for applying the next layer, but with proper spacing of extruders and the selection of appropriate treatment conditions intermediate the extruders, an insulated conductor of the invention may be manufactured in a continuous operation with the conductor being fed into one end of the production line and with the completed insulated conductor exiting from the other end of the line.

The insulated conductor of the invention may be used by itself or with a further insulating layer or a conductive sheath therearound. A plurality of such conductors may be stranded to form twisted pairs or may be assembled in a bundle covered by a protective sheath. Also, several insulated conductors may be placed in side-by-side relation and be bonded together at their contacting surfaces.

Figure 5:
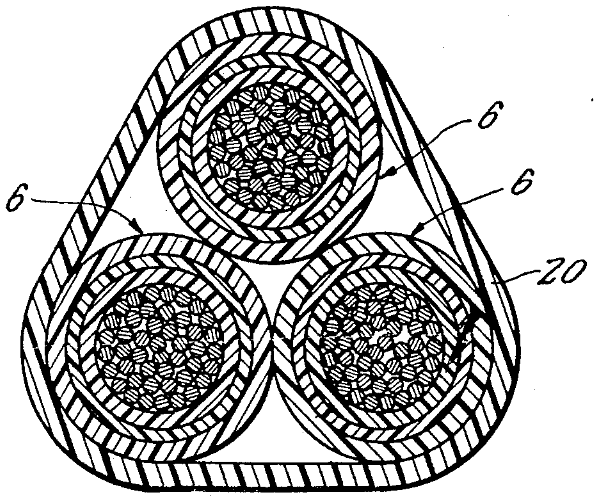
FIG. 5 is a transverse cross-section of three of the insulated conductors of the invention twisted together and enclosed in a sheath of plastic material.

FIG. 5 illustrates three insulated conductors 6 of the invention stranded together and surrounded by a sheath 20 of a plastic material. The plastic material for the sheath is selected to provide the desired temperature rating, as described hereinbefore, and for example, if the temperature rating is to be 200° C. or higher, the plastic material can be PFA.

In the various embodiments, the plastic materials may have conventional fillers which do not materially affect the desired properties of the insulation of the cable in an adverse manner.

Although preferred embodiments of the present invention have been described and illustrated, it will be apparent to those skilled in the art that various modifications may be made without departing from the principles of the invention.

The embodiment of the invention in which an exclusive property or privilege is claimed are defined as follows:

1. A conductor with insulation consisting essentially of a first, second and third continuous non-tape superimposed layers having a temperature rating of at least 150° C., said first layer around and in contact with said conductor and consisting essentially of a plastic selected from the group consisting of perfluoroalkoxy, polytetrafluoroethylene, ethlene-tetraflouroethylene copolymer and fluorinated ethylene-propylene resins; said second layer comprising a polyimide resin around and in contact with said first layer; said third layer being around and in contact with said second layer and consisting essentially of a plastic selected from the group consisting of perfluoroalkoxy, ethylene-tetrafluoroethylene copolymer, polyvinylidine fluoride and a substantially non-hydrolizing thermoset polyamide resin.

2. A conductor as set forth in claim 1 wherein said first layer and said third layer is perfluoroalkoxy resin and said insulated conductor has a temperature rating of at least 200° C.

3. A conductor as set forth in claim 1 wherein the radial thicknesses of said first layer and said third layer are greater than the radial thicknesses of said second layer.

4. A conductor as set forth in claim 1 wherein the polyamide resin of said ssecond layer is thermoset.

5. A conductor as set forth in claim 1 wherein at least one of said layers is thermoplastic.

6. A conductor as set forth in claim 1 wherein said second layer is an extruded layer.

7. A conductor as set forth in claim 1 wherein at least one said layer is an extruded layer.

8. A conductor as set forth in claim 1 wherein each of said first layer, said second layer and said third layer is an extruded layer.

9. A conductor as set forth in claim 1 wherein at least one of said layers is a coated layer.

10. A conductor as set forth in claim 1 wherein said first layer is selected from the group consisting of perfluoroalkoxy and polytetrafluoroethylene resins, and said third layer is selected from the group consisting of perfluoroalkoxy, ethylene-tetrafluoroethylene copolymer and polyvinylidine resins.

11. A conductor as set forth in claim 1 wherein said third layer is a substantially nonhydrolizing, thermoset polyamide.

12. A conductor as set forth in claim 1 wherein said first layer is selected from ethylene-tetrafluoroethylene and fluorinated ethylene-propylene resins and said third layer is a substantially non-hydrolizing, thermoset polyamide.

13. A conductor as set forth in claim 1 wherein said second layer consists essentially of polyimide resin.

14. A conductor as set forth in claim 10 wherein said first layer is perfluoralkoxy resin.

15. A conductor as set forth in claim 10 wherein said first layer is polytetrafluoroethylene.

16. A conductor as set forth in claim 14 wherein said third layer is ethylene-tetrafluoroethylene.

17. A conductor as set forth in claim 15 wherein said third layer is ethylene-tetrafluoroethylene.

18. A conductor as set forth in claim 14 wherein said third layer is polyvinylidine fluoride.

19. A conductor as set forth in claim 15 wherein said third layer is polyvinylidine fluoride.

* * * * *